(12) United States Patent
Pieters

(10) Patent No.: US 12,709,139 B2
(45) Date of Patent: Aug. 18, 2026

(54) POP-UP ROOF SYSTEM FOR A CAMPER OR TRAILER

(71) Applicant: Adventurer Manufacturing, Inc., Yakima, WA (US)

(72) Inventor: Tyler J. Pieters, Yakima, WA (US)

(73) Assignee: ADVENTURER MANUFACTURING, INC., Yakima, WA (US)

( * ) Notice: Subject to any disclaimer, the term of this patent is extended or adjusted under 35 U.S.C. 154(b) by 208 days.

(21) Appl. No.: 18/658,988

(22) Filed: May 9, 2024

(65) Prior Publication Data

US 2025/0346101 A1 Nov. 13, 2025

(51) Int. Cl.
*B60J 7/16* (2006.01)
*B60P 3/34* (2006.01)

(52) U.S. Cl.
CPC ................. *B60J 7/165* (2013.01); *B60P 3/34* (2013.01)

(58) Field of Classification Search
CPC .................................... B60J 7/165; B60P 3/34
See application file for complete search history.

(56) References Cited

U.S. PATENT DOCUMENTS

| | | | | |
|---|---|---|---|---|
| 5,299,850 | A * | 4/1994 | Kaneko | B60J 7/1291 296/107.13 |
| 5,511,844 | A * | 4/1996 | Boardman | B60J 7/123 114/361 |
| 6,206,450 | B1 * | 3/2001 | Ide | B60J 7/1291 296/217 |
| 11,207,959 | B2 * | 12/2021 | Gauci | B60J 7/1234 |
| 11,794,627 | B2 * | 10/2023 | Wise | B60P 3/39 |

FOREIGN PATENT DOCUMENTS

| | | | | |
|---|---|---|---|---|
| DE | 202007011930 | U1 * | 1/2009 | B60J 7/1642 |
| DE | 212018000247 | U1 * | 2/2020 | E04H 15/48 |
| WO | WO-2021109070 | A1 * | 6/2021 | E04H 15/06 |

* cited by examiner

*Primary Examiner* — Faye M Fleming
(74) *Attorney, Agent, or Firm* — Svendsen Legal, LLC

(57) ABSTRACT

An apparatus for a pop-up roof system for a vehicle, which is especially suited for use with a camper or a trailer, and more specifically a pop-up roof system that includes a levered mid-bar that pivots to raise or lower a roof shell or canopy. The pop-up roof system operates in tandem with a parallel acting pair of pop-up assemblies mounted on the interior sidewalls of the camper that can raise and lower a canopy without undue effort and strength. The operation of the pop-up roof system is a step-wise action the pop-up assemblies to raise or lower the canopy. The canopy is able to travel up and down from a retracted position to an extended position with action of a set of arm and levers, supplemented with a pair of struts to aid manual actuation of the pop-up roof system.

9 Claims, 18 Drawing Sheets

POP-UP ROOF SYSTEM FOR A CAMPER OR TRAILER

TECHNICAL FIELD

The present disclosure relates to and is applicable to a pop-up roof system for a vehicle, which is especially suited for use with a camper or a trailer, and more specifically a pop-up roof system that includes a levered mid-bar that pivots to raise or lower a roof shell or canopy.

BACKGROUND OF THE INVENTION

Campers are a common addition for pick-up trucks and a great variety of such units have been manufactured for many years. Campers provide a compact and easy method of bringing a small, homelike enclosure to camping and traveling. Recent developments in camper design and engineering have focused on making the camper units more compact and road-worthy. One such development has been the expandable height camper. Such campers employ a "pop-up" style of mechanism previously used in trailers, to reduce the overall height when traveling, while reducing weight and providing a more streamline appearance. However, such pop-up types of camper and truck extensions are typically cumbersome to operate and fail to provide a user-friendly, easy to deploy mechanism that is quick to actuate or raise and lower, with security and safety.

Therefore, there is a need for a quick and easy to use pop-up system for a camper or trailer that can raise and lower a canopy without undue effort and strength. The present invention addresses these needs for such an improved pop-up system specially configures for use with a camper, and with inventive features that will be better understood by reference to the following detailed description taken in conjunction with the accompanying drawings.

BRIEF DESCRIPTION OF THE DRAWINGS

Exemplary embodiments of the technology will become more fully apparent from the following descriptions and appended claims, taken in conjunction with the accompanying drawings. Understanding that these drawings depict only exemplary embodiments and are, therefore, not to be considered limiting of the scope of the technology, the exemplary embodiments will be described with additional specificity and detail through use of the accompanying drawings in which:

Figure 1A:
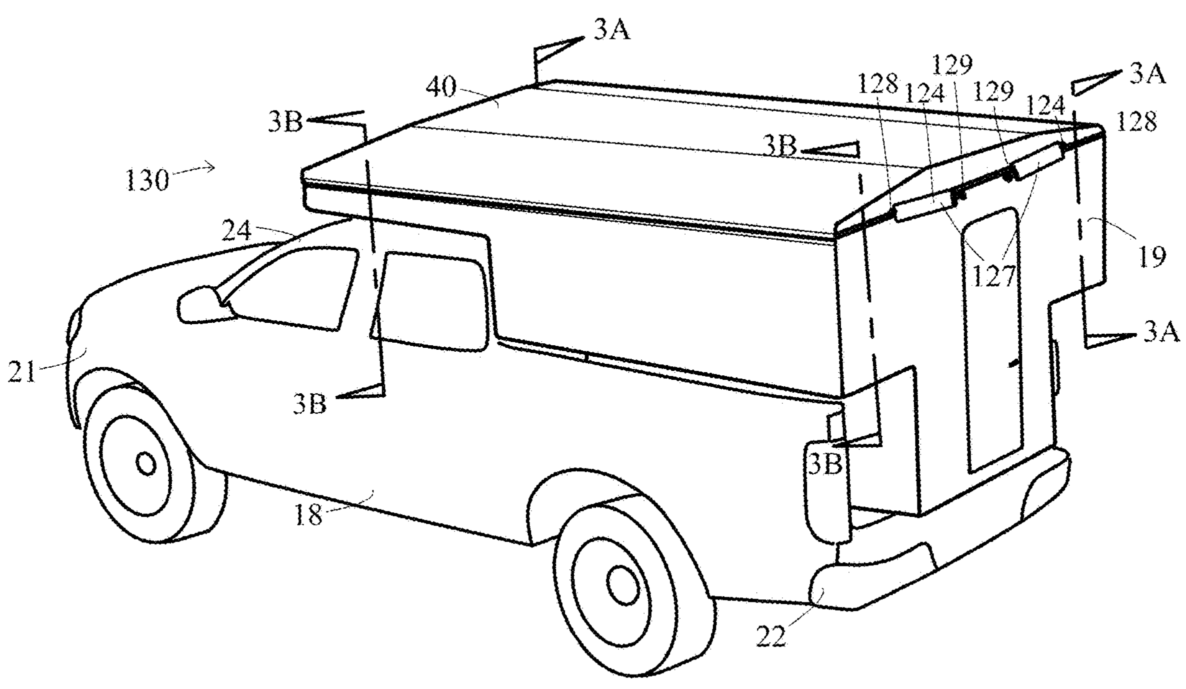
FIG. 1A is a rear perspective view of a pop-up roof system for a vehicle, according to an embodiment of the invention.

Reference characters included in the above drawings indicate corresponding parts throughout the several views, as discussed herein. The description herein illustrates one preferred embodiment of the invention, in one form, and the description herein is not to be construed as limiting the scope of the invention in any manner. It should be understood that the above listed figures are not necessarily to scale and may include fragmentary views, graphic symbols, diagrammatic or schematic representations. Details that are not necessary for an understanding of the present invention by one skilled in the technology of the invention, or render other details difficult to perceive, may have been omitted.

DETAILED DESCRIPTION OF SPECIFIC EMBODIMENTS

The present disclosure relates to and is applicable to a pop-up roof system that includes a. This technical description of the pop-up roof system is provided herein by way of example. However, it should be noted that other similar configurations and components could be utilized in alternative embodiments of the pop-up roof system of the present invention.

Exemplary embodiments of the pop-up roof system 15, will be best understood by reference to the drawings FIGS. 1A through 19 as included herewith, with like parts designated by like numerals throughout. It will be readily understood that apparatus elements employed in the pop-up roof system, as described and illustrated in the figures herein, could be arranged and designed in a variety of different configurations. Thus, the following detailed description of the embodiments of the pop-up roof system of the present invention with the preferred elements of its apparatus and method of its operation are not intended to limit the scope of the invention, as claimed, but is merely representative of exemplary embodiments of the technology.

Specifically, the present invention provides for a pop-up roof system 15 is configured for use as a component of a vehicle 18 with a camper unit 19 as the vehicle mounted component for a preferred embodiment of the pop-up roof system. The camper unit may be referred to herein simply as the "camper". Also, it is considered that the pop-up roof system could be utilized in a stationary location, such as a component of a temporary shelter, a tent, a canopy, or other enclosure and as such the term camper is used interchangeably, in this detailed specification.

Pop-Up Roof System Elements

FIGS. 1A through 4B show a preferred embodiment of the pop-up roof system, mounted as part of the camper 19 received within or onto the vehicle 18, such as a conventional "pick-up" truck, which could be any "recreational" type of vehicle including a sports utility vehicle. The preferred embodiment of the pop-up roof system is utilized as a component of the camper unit, with the camper unit received into the vehicle, which is most preferably a pick-up truck. Also, the pop-up roof system could be incorporated into a "camper-van" in an additional alternative embodiment.

Throughout this written specification and referenced FIGS., the vehicle 18 described and shown includes a forward end 21 and a rearward end 22, as illustrated in FIG. 1A through 4B, with the term "fore" used herein to describe elements that are nearer to the forward end of the vehicle, and the term "aft" used herein to describe elements that are nearer to the rearward end of the vehicle. Alternatively, the term "first" may be used as a substitute for the term "fore" and the term "second" may be substituted for the term "aft", especially in alternative embodiments where the pop-up assembly 33 is mounted laterally, or relatively left to right, instead of forward and rearward. As shown in FIGS. 1A, 1B, 2A and 2B, the conventional pick-up truck vehicle includes a bed 23 at the rearward end of the vehicle that abuts to a cab 24 proximate to the forward end of the vehicle.

Figure 1B:
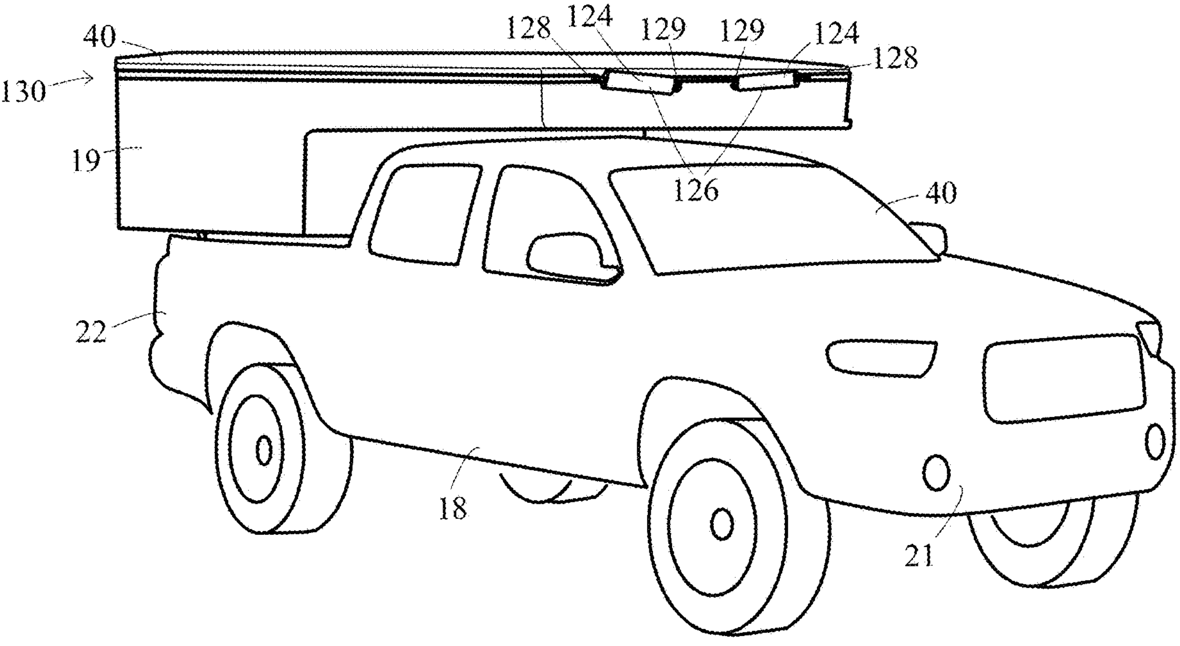
FIG. 1B is a front perspective view of a pop-up roof system for a vehicle, according to an embodiment of the invention.

Most preferably, as shown in FIGS. 1A and 1B, camper unit is received into the bed 23 of the vehicle, with the pop-up roof system 15 incorporated in the camper unit 19. Preferably, the pop-up roof system includes a pair of pop-up assemblies 30, namely a first pop-up assembly 31 and a second pop-up assembly 32. Each of the pair of pop-up assemblies may be simply referred to individually in the present disclosure as a pop-up assembly 33.

Figure 3A:
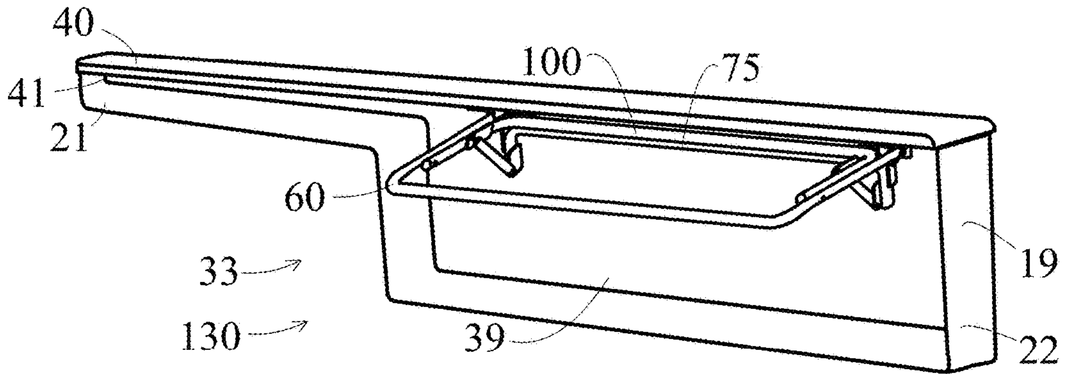
FIG. 3A is a section perspective view of a pop-up roof system for a vehicle taken along section lines 3A-3A of FIG. 1A, according to an embodiment of the invention.
Figure 4A:
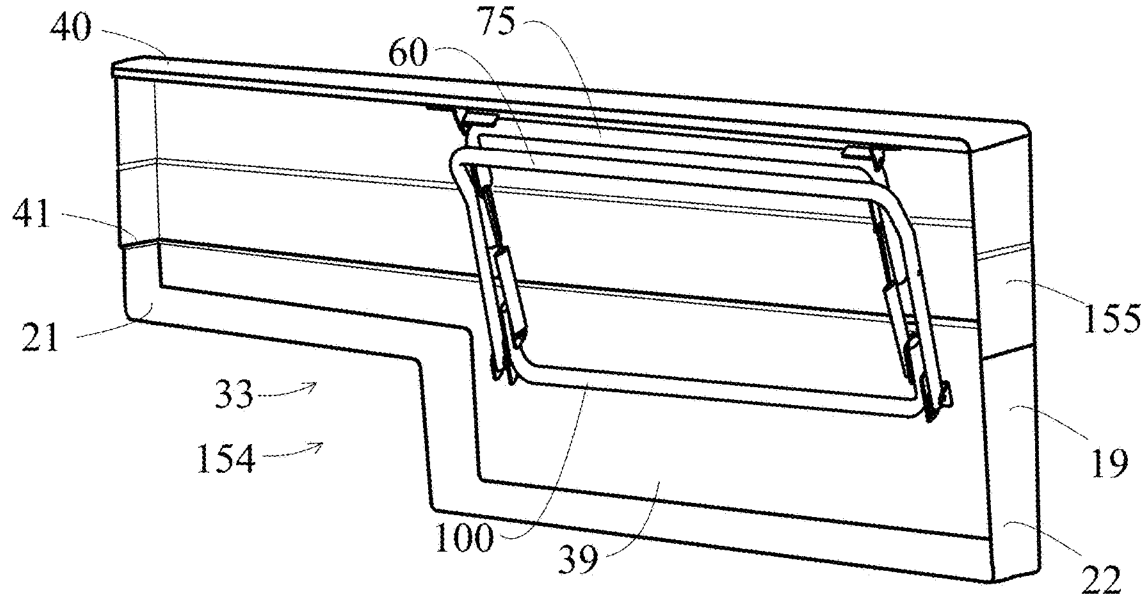
FIG. 4A is a section perspective view of a pop-up roof system for a vehicle taken along section lines 4A-4A of FIG. 2A, according to an embodiment of the invention.
Figure 3B:
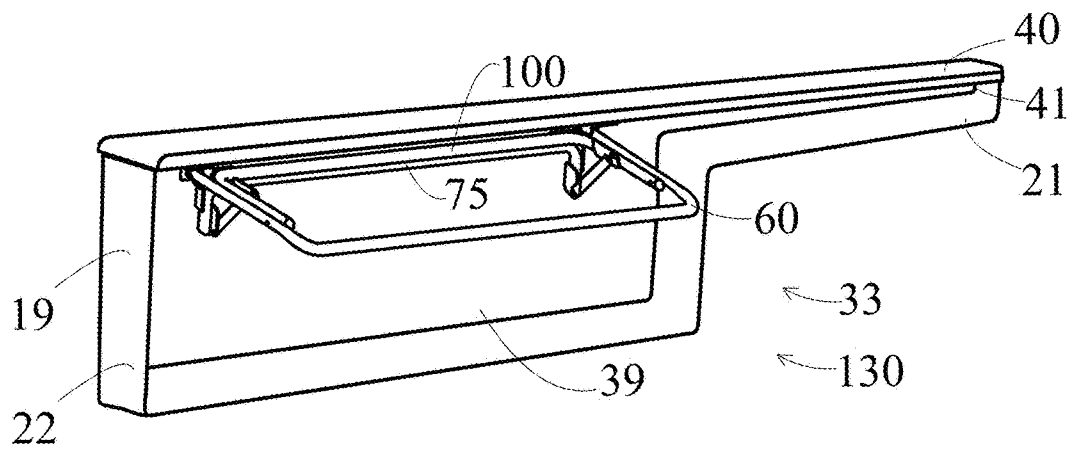
FIG. 3B is a section perspective view of a pop-up roof system for a vehicle taken along section lines 3B-3B of FIG. 1A, according to an embodiment of the invention.
Figure 4B:
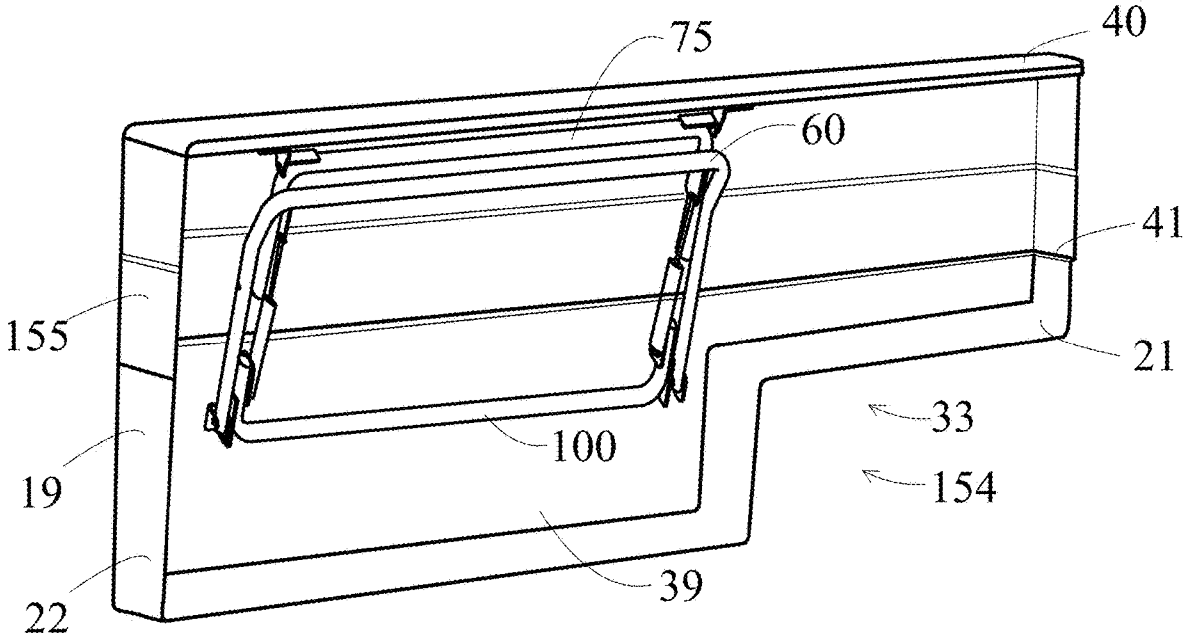
FIG. 4B is a section perspective view of a pop-up roof system for a vehicle taken along section lines 4B-4B of FIG. 2A, according to an embodiment of the invention.

The first pop-up assembly 31 and the second pop-up assembly 32 are substantially identical, but preferably are mirrored versions of each other. Most preferably, the first pop-up assembly mounts within the camper unit 19 on a first side 36 of the camper unit, as shown in FIGS. 3A and 4A, and the second pop-up assembly mounts to the camper unit on a second side 37 of the camper unit, a mirror of the first pop-up assembly as shown in FIGS. 3B and 4B. Specifically, the first side and the second side within the camper are each an interior sidewall 39 of the camper, laterally opposed to and across from one another.

Preferably, the camper unit using the pop-up roof system 15 includes a canopy 40. The canopy is most preferably a hard cover or shell that provides a weather proof cover over the camper unit. The pair of pop-up assemblies 30 operates in parallel to raise and extend, or lower and retract the canopy onto the camper unit 19. Specifically, the camper also includes a sidewall cap 41, onto which the canopy can rest, and the pair of pop-up assemblies 30 operate together, to either raise the canopy upward and off of the sidewall cap, or lower the canopy downward and onto the sidewall cap of the camper, with the first pop-up assembly 31 on the first side 36 of the camper and the second pop-up assembly 32 on the second side 37 of the camper.

Each pop-up assembly is most preferably operated manually, with the aid of a pair of struts 44, as shown in FIGS. 3A through 4B. The pair of struts serve to counter-balance operational forces and weights encountered as the pop-up assembly 33 extends or retracts, including counter-balancing the weight of the canopy 40 as supported by the pop-up mechanism. The pair of struts may be referred to individually herein as a strut 45. Struts are conventional piston-and-cylinder actuators that serve to provide extension force and resist compression or retraction, similar to the action of a spring. The strut, as shown in FIG. Y either extends or retracts a strut piston 47 as received onto a strut body 48.

A preferred strut 44 employed in the pop-up roof system 15 of the present invention, is a lifting type of strut, the selection of which are well known to those skilled in strut engineering and specifications. Furthermore, the preferred strut is a sealed, gas-filled lift-strut that is actuated by manual movements of the pop-up assembly 33. In an alternative embodiment of the pop-up roof system of the present invention, power actuated struts could be employed that are extended and retracted using hydraulic or pneumatic systems to extend or retract.

As shown in FIGS. 3A through 4B, the pair of pop-up assemblies 30 each includes a pair of struts 44, specifically a first or "fore" strut 51 and a second or "aft" strut 52. The use of the pair of struts in each pop-up assembly 33 is most preferred, to provide a more balanced action in the operation of the pop-up assembly.

The pop-up assembly 33 is mounted preferably within the bed 23 of the camper 19 as shown in FIGS. 3A through 4B, again with use of the pair of pop-up assemblies 30 as most preferred, with the first pop-up assembly mounted on the first side 36 of the camper unit and the second pop-up assembly mounted on the second side 37 of the camper unit.

Figure 8:
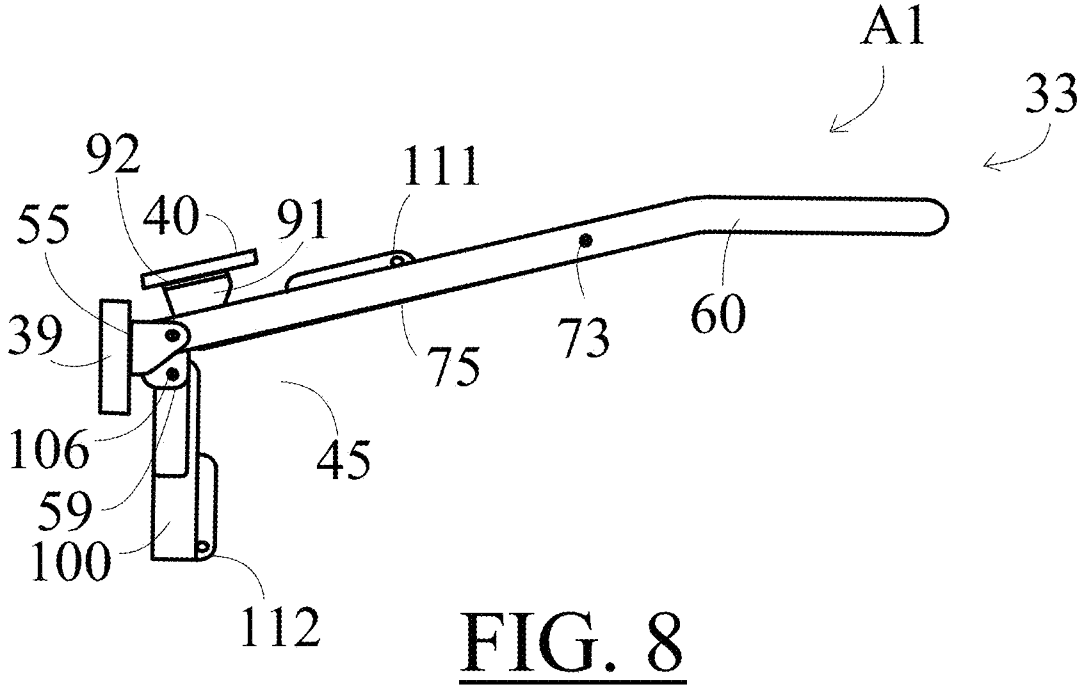
FIG. 8 is a side view of a pop-up assembly, according to an embodiment of the invention.

As shown in FIGS. 8 though 13, each pop-up assembly 33 of the pop-up roof system 15 includes a wall-mount 55 that securely mounts to the interior sidewall 39 of the camper unit 19. Two wall-mounts are preferred for each pop-up assembly, specifically a fore wall-mount 56 and an aft wall-mount 57. The fore wall-mount is securely attached to the interior sidewall of the camper unit at a placement proximate to the forward end 21 of the camper, and the aft wall-mount is securely attached to the interior sidewall of the camper unit at a placement proximate to the rearward end 22 of the camper. Again, the terms "fore" and "aft" could be replaced by alternative component relational terms such as; "first" and "second", "left" and "right", or "proximal" and "distal", when describing variations, alternative installations or employments of the pop-up assemblies.

Additionally, each wall-mount 55 includes a lever-bar hinge 59 for receiving a lever-bar 60 that hinges on the wall-mount. The lever-bar is substantially U-shaped, with a fore lever-bar distal end 61 and an aft lever-bar distal end 62. The fore lever-bar distal end of the lever-bar hingeably attaches to a fore lever-bar hinge 66 of the fore wall-mount, and the aft lever-bar distal end of the lever-bar hingeably attaches to an aft lever-bar hinge 67 of the aft wall-mount.

Figure 5:
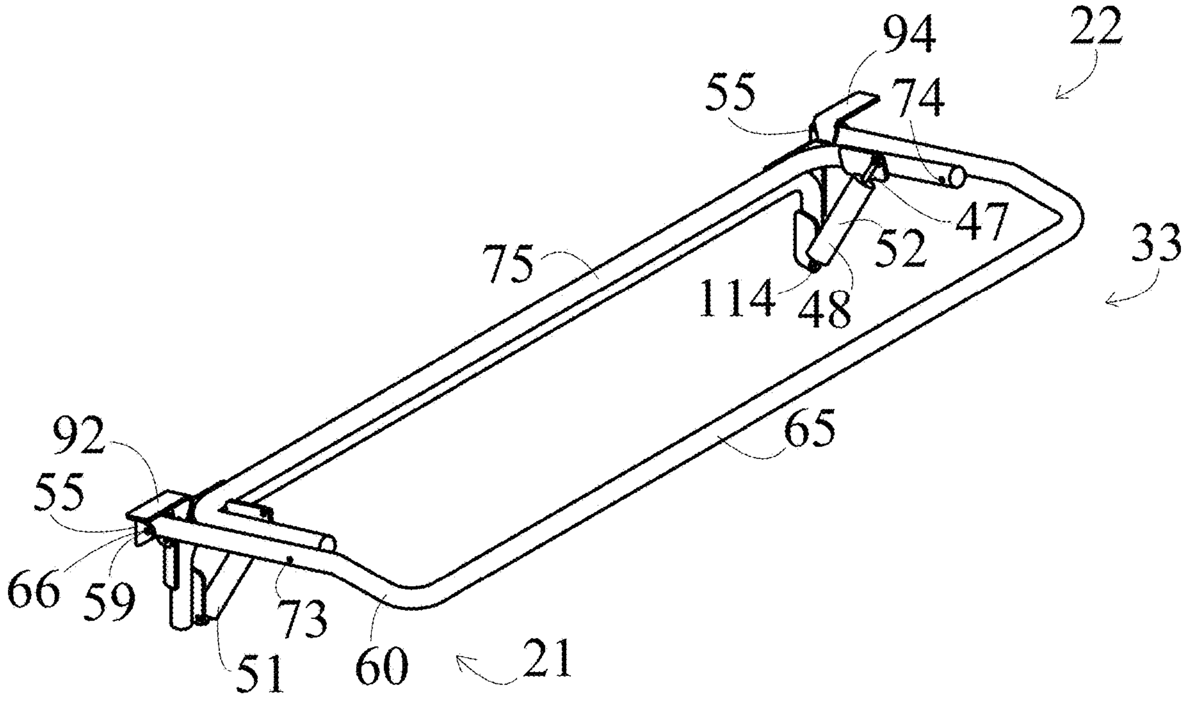
FIG. 5 is a perspective view of a pop-up assembly, according to an embodiment of the invention.

Again, most preferably the lever-bar 60 is substantially U-shaped, and additionally the lever-bar includes a fore lever-bar arm 63 that terminates with the fore lever-bar distal end 61, and the lever-bar includes an aft lever-bar arm 64 that terminates with the aft lever-bar distal end 62. A lever-bar grip-bar 65 inter connects the fore lever-bar arm with the aft lever-bar arm, as shown in FIG. 5. The lever-bar grip-bar can be grasped and manually raised or manually lowered, to operate certain steps in executing the pop-up roof system 15, as discussed later herein.

The lever-bar 60 also includes roof-bar pivots located at an approximate mid-point of each lever-bar arm. Specifically, the fore lever-bar arm 63 includes a fore roof-bar pivot 73 and the aft lever-bar arm 64 includes an aft roof-bar pivot 74.

A roof-bar 75 pivotably attaches to the lever-bar 60 at each roof-bar pivot. Similar in overall shape and size to the lever-bar 60, the roof-bar 75 is substantially U-shaped with a fore-roof distal end 81, and an aft-roof distal end 82 as shown in FIG. 5. The fore-roof distal end of the roof-bar hinge-ably attaches to the fore roof-bar pivot 73 on the lever-bar fore-arm 63, and the aft-lever distal end of the lever bar hinge-ably attaches to the aft roof-bar pivot 74 on the lever-bar aft-arm 64.

Again, the roof-bar 75 is substantially U-shaped, and additionally includes a fore roof-bar arm 83 that terminates with the fore roof-bar distal end 81, and the roof-bar includes an aft roof-bar arm 84 that terminates with the aft roof-bar distal end 82. A roof-bar lateral-bar 85 interconnects the fore roof-bar arm with the aft roof-bar arm, as shown in FIG. 6.

Additionally, the roof-bar 75 includes a pair of canopy mounts that hingeably attach to the canopy 40. Again, as is a most preferred embodiment of the pop-up roof system 15 of the present invention, the canopy is a roof structure on the camper unit. As shown in FIG. 6, the roof-bar includes a fore roof-bar elbow 86 located proximate to where the fore roof-bar arm 83 meets the roof-bar lateral-bar 85, and the roof-bar includes an aft roof-bar elbow 87 located proximate to where the aft roof-bar arm 84 meets the roof-bar lateral-bar, also as shown in FIG. 6.

Figure 6:
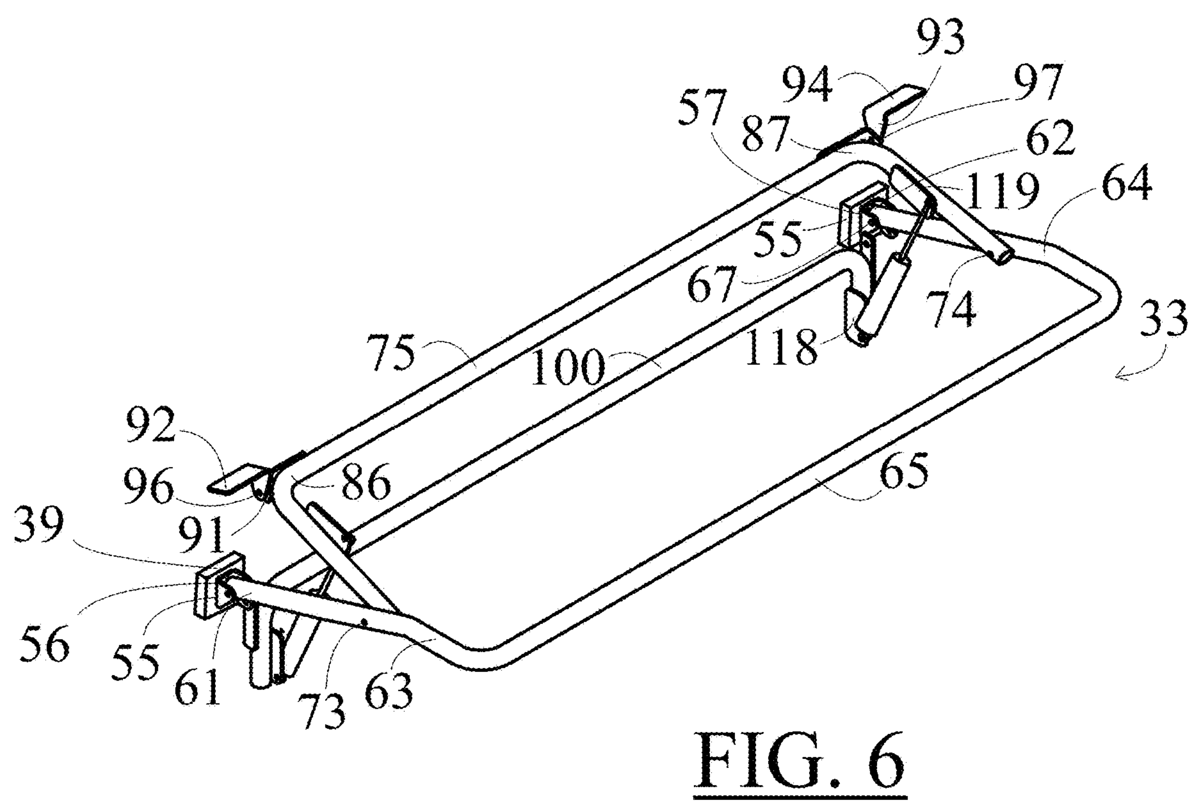
FIG. 6 is a perspective view of a pop-up assembly, according to an embodiment of the invention.
Figure 7:
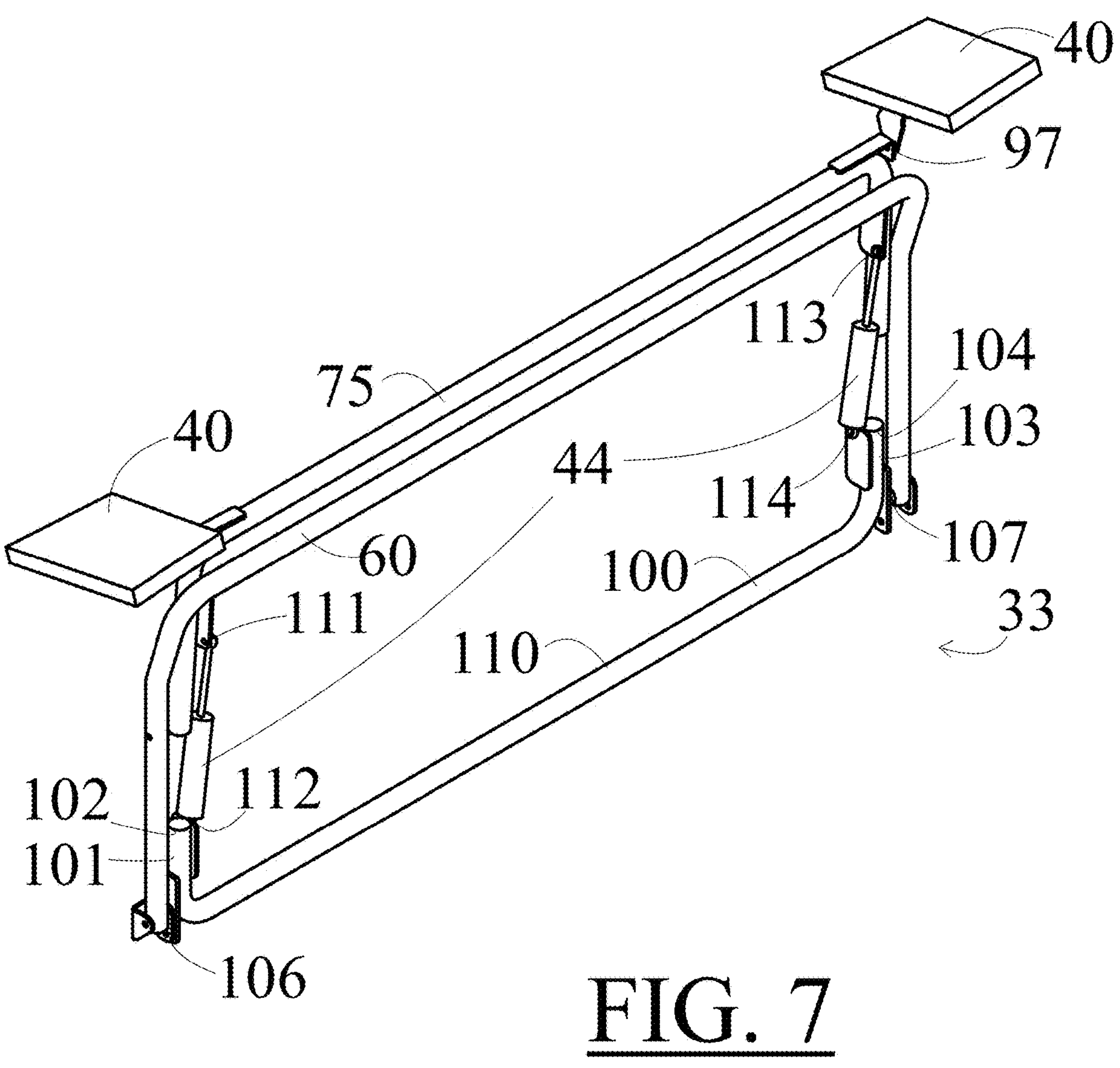
FIG. 7 is a perspective view of a pop-up assembly, according to an embodiment of the invention.
Figure 9:
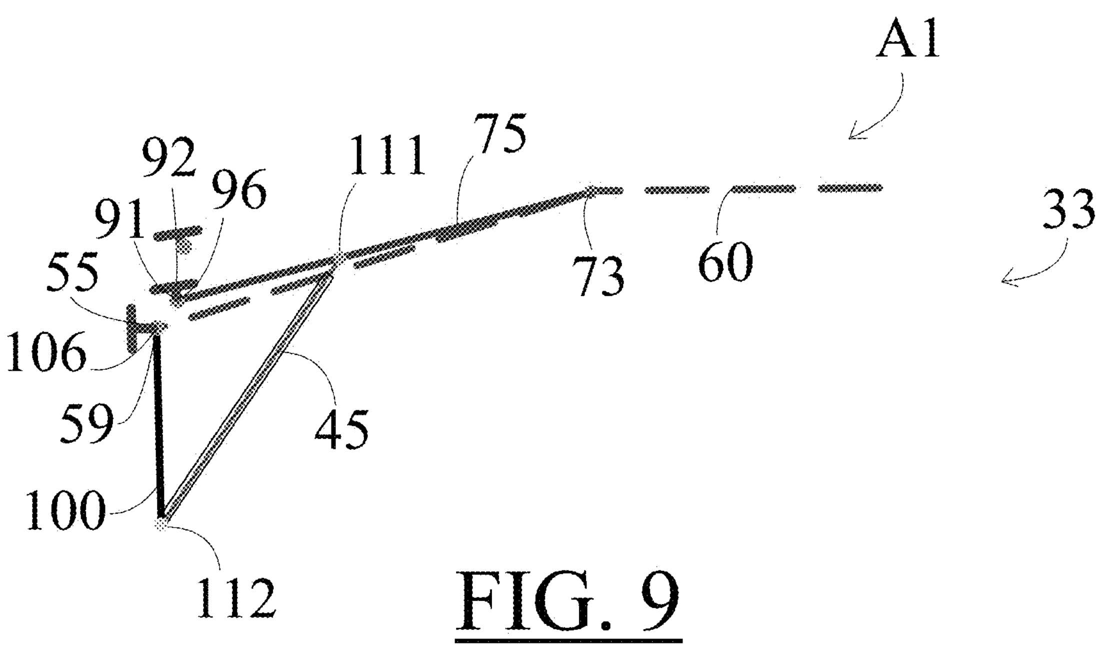
FIG. 9 is a schematic side view of a pop-up assembly, according to an embodiment of the invention.

The canopy 40 pivotably attaches to the roof-bar 75, as shown in FIG. 7. Preferably, two canopy-links are employed in each pop-up assembly 33. Specifically, a fore canopy-link 91 attaches to the canopy at a fore canopy-mount 92, and an aft canopy-link 93 attaches to the canopy at an aft canopy-mount 94, as shown in FIG. 6. The fore canopy-link also includes a fore roof-bar pivot 96, and the aft canopy-link also includes an aft roof-bar pivot 97. The fore roof-bar pivot attaches to the roof-bar 75 proximate to the fore roof-bar elbow 86, and the aft roof-bar pivot attaches to the roof-bar proximate to the aft roof-bar elbow 87. With the use of the two canopy-links, the canopy is able to hingeably rotate upon, while being supported by the roof-bar.

Additionally, each wall mount 55 as first disclosed herein above, includes a lock-bar hinge for receiving a lock-bar 100 that similarly to the lever-bar 60, also hinges on the wall mount, as shown in FIG. 6. Similar in overall shape to both the roof-bar 75 and the lever-bar 60, the lock-bar is substantially U-shaped, with a fore lock-bar arm 101 that terminates at a fore lock-bar distal end 102, an aft lock-bar arm 103 that terminates and an aft lock-bar distal end 104. The fore lock-bar distal end of the lock-bar hingeably attaches to a fore lock-bar hinge 106 of the fore wall-mount 56, and the aft lock-bar distal end of the lock-bar hingeably attaches to an aft lock-bar hinge 107 of the aft wall-mount.

Again, in a most preferred embodiment of the pop-up roof system 15, the lock-bar 100 is substantially U-shaped and additionally includes a lock-bar grip-bar 110 that inter connects the lock-bar fore-arm 101 with the lock-bar aft-arm 103, as shown in FIG. 7. The lock-bar grip-bar can be grasped and manually raised or lowered for specific steps in the operation of the pop-up roof system, as discussed later herein.

As discussed above, the struts 45 in each pop-up assembly 33 of the pop-up roof system 15, preferably include the fore strut 51 and the aft strut 52, with the use of the pair of struts 44 in each pop-up assembly 33 as preferred to provide a more balanced action in operation of the pop-up assembly. Most preferably, one pair of struts is located within each pop-up assembly as shown in FIGS. 8 though 13, with the fore strut located toward the forward end 21 of the camper 19 and the aft strut located toward the rearward end 22 of the camper.

Specifically, the fore strut 51 has a fore-strut lever-bar pivot 111, and a fore strut lock-bar pivot 112 at the opposite end of the fore-strut. The aft strut 52 has an aft strut lever-bar pivot 113, and an aft strut lock-bar pivot 114 at the opposite end of the aft-strut.

Each strut 45 interconnects the lock-bar 100 to the lever bar 60, with each strut hingeably attached to a lock-bar strut bracket located on the lock-bar proximate to the distal end of each lock-bar arm, and with each strut hingeably attached to a fore lever-bar strut bracket located on the lever-bar, proximate to the distal end of each lever-bar arm.

Specifically, as shown in FIGS. 5 through 7, the fore strut lock-bar pivot 112 connects to a fore lock-bar strut bracket 116 on the lock-bar 100, and the fore strut lever-bar pivot 111 attaches to a fore lever-bar strut bracket 117 on the lever-bar 60. Similarly, the aft strut lock-bar pivot 114 connects to an aft lock-bar strut bracket 118 on the lock-bar 100, and the aft strut lever-bar pivot 113 attaches to an aft lever-bar strut bracket 119 on the lever-bar 60.

The bars, arms and grips of the pop-up assemblies 30 for use with the pop-up roof system 15 are preferably made of a tubular metal material such as aluminum, the selection and use of which are is well known to those skilled in metal fabrication technologies. Alternatively, it is considered that a plastic, wood, graphite composite, or other metal, or a combination of these materials could be used to the elements of the pop-up assemblies, as described herein.

Figure 2A:
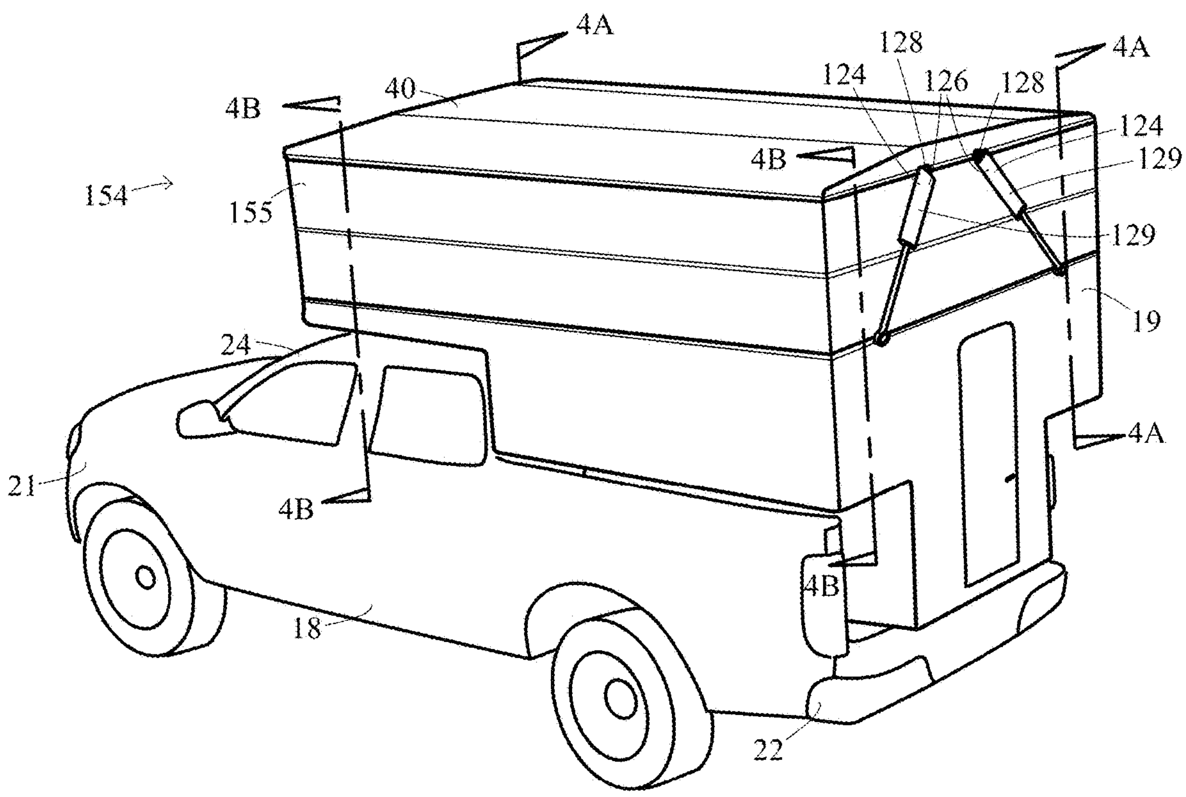
FIG. 2A is a rear perspective view of a pop-up roof system for a vehicle, according to an embodiment of the invention.
Figure 2B:
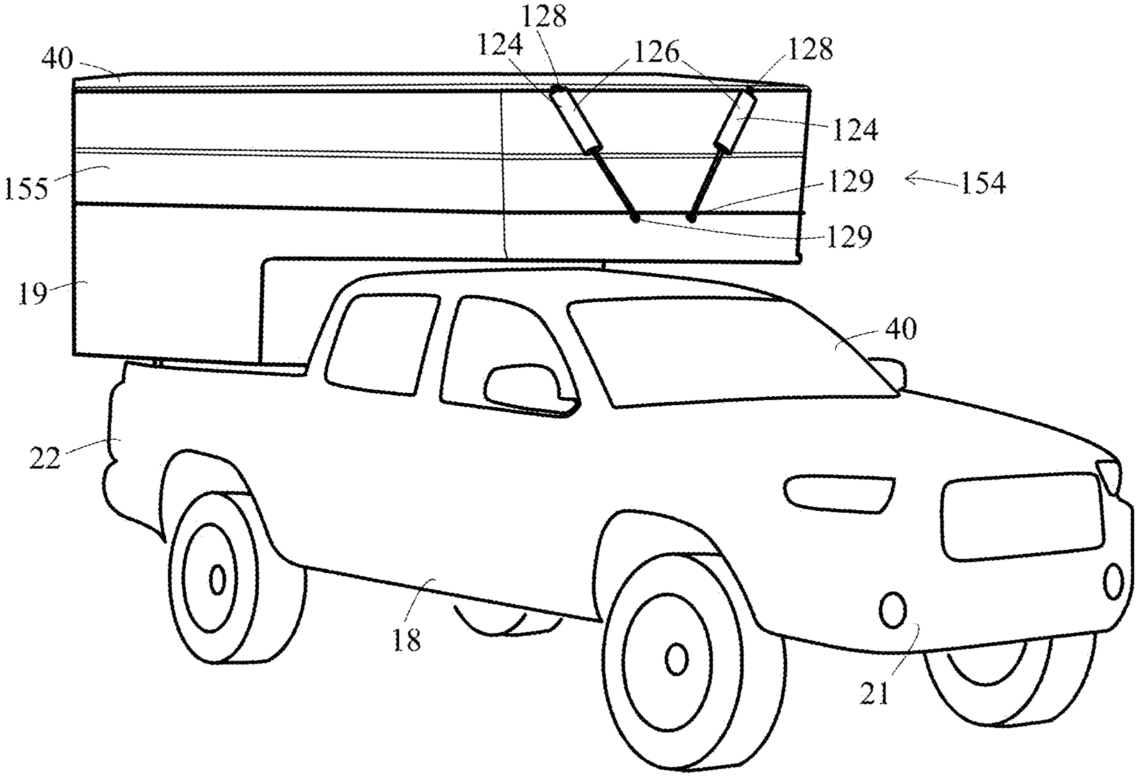
FIG. 2B is a front perspective view of a pop-up roof system for a vehicle, according to an embodiment of the invention.

As an additional and preferred feature of the pop-up roof system 15, a multiple of auxiliary struts 124, which can be referenced herein simply as "aux struts". Most preferably, as set of four of the aux struts can be utilized to aid the operation of each pop-up assembly 33. FIGS. 1B and 2B show a front pair of aux struts 126 mounted at the foreword end 21 of the camper 19, and FIGS. 1A and 2A show a rear pair of aux struts 127 mounted at the rearward end 22 of the camper. The front pair and the rear pair of the auxiliary struts operate together to help lift the canopy 40 with ease, and aid operation of the pop-up assemblies. Each of the four aux struts has a canopy aux strut connection 128, and a sidewall cap aux strut connection 129.

The canopy aux strut connection 128 of each of the four auxiliary struts 124 mounts to the canopy 40 above the sidewall aux strut connection at approximately a forty-five degree angle below the canopy connection, when the canopy is in the extended canopy position 154. The sidewall aux strut connection mounts to the camper proximate to the upper portion of the camper near the sidewall cap 41, as shown in FIGS. 1A through 2B. The set of four auxiliary struts are selected to substantially counter the weight of the canopy, and to augment the lifting action of the pair of strut 44 components of the pop-up assemblies.

Alternatively, each strut 45 disclosed and discussed and depicted herein as an element of the pop-up roof system 15, which includes the auxiliary struts 124 as well as the fore struts 51 and aft struts 52 in each pop-up assembly 33, can be reversely oriented with the strut piston 47 reversed with the strut body 48, as is known to those skilled in the selection and installation of struts.

Pop-Up Roof System Sequence of Operation

Again, as most preferably, the pop-up roof system 15 operates in tandem, with pair of pop-up assemblies 30, namely the first pop-up assembly 31 mounted on the interior sidewall 39 on the first side 36 of the camper 19, and the second pop-up assembly 32 mounted on the second side 37 of the camper 19, as shown in FIGS. 3A through 4B.

The operation of the pop-up roof system 15 is a step-wise action of each pop-up assembly 33 to raise or lower the canopy 40, as mounted to the roof-bar 75. The canopy is able to travel up and down from a retracted canopy position 130 as shown in FIGS. 1A and 1B, to an extended canopy position 154 as shown in FIG. 2. The step-wise actions of the pop-up assembly can be described in a series of actuated "Positions", as detailed below and shown in FIGS. 8 through 19. Position A1 of the pop-up assembly 33 is shown in FIGS. 3A, 3B, 8, and 9, with the canopy 40 lowered and resting on the sidewall cap 41 of the camper 19, and the strut 45 in a retracted strut position 121, with the strut piston 47 substantially retracted within the strut body 48. Securely forcing the canopy down and onto the sidewall cap in Position 1, the lock-bar 100 presses against the interior sidewall 39 of the camper, and the lever-bar grip-bar is rotated upward and tight against the canopy.

Position A1 is in the lowered or retracted canopy position 130, which is an initial resting, or "stowed" position of the pop-up assembly 33. As an option in Position A1, the canopy 40 can be further locked to the sidewall of the camper 19 with straps or latches, for security and for secure movement of the vehicle 18 with the attached camper unit, if desired.

Figure 14:
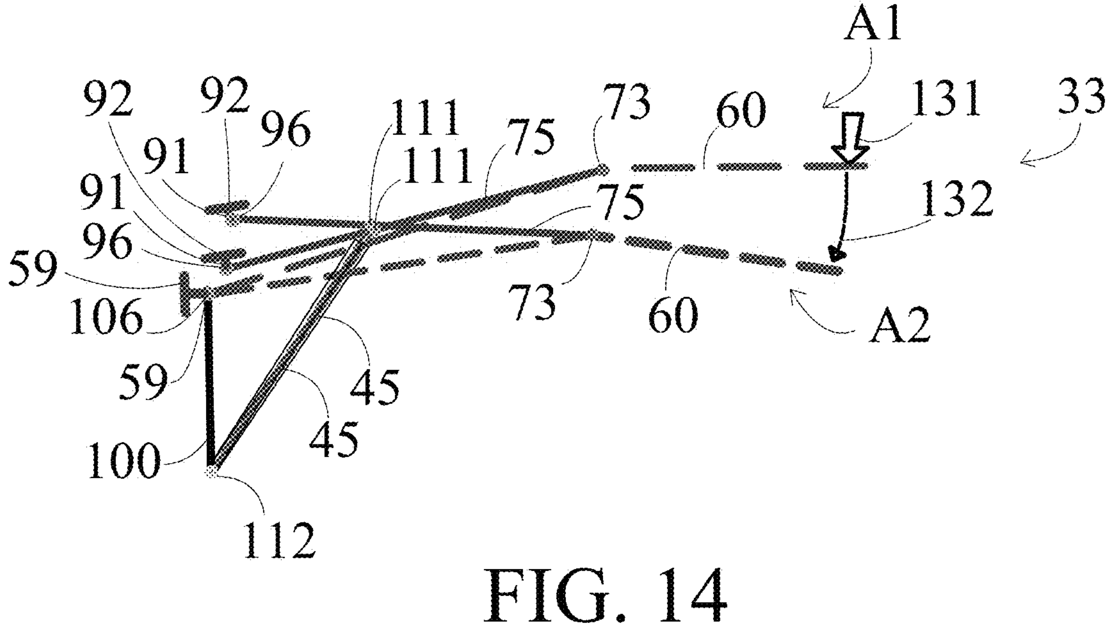
FIG. 14 is a schematic side view of an operational step of a pop-up roof system, according to an embodiment of the invention.

The actuated transition from Position A1 to Position A2 of the pop-up assembly 33 in the operation of the pop-up roof system 15 is shown in FIG. 14. By pulling the lever-bar 60 downward with an A1 applied force 131, as shown with the bold arrow in FIG. 14. The lever-bar travels an A1 to A2 movement 132, as shown with an arrow. This A1 to A2 movement slightly raises the canopy 40, from the fully closed position as shown in FIGS. 3A and 3B. The canopy 40 is released off of the sidewall cap 41 of the camper 19, but with the strut 45 remaining in the retracted strut position 121. The canopy as attached to the roof-bar 75 is now ready to be raised further in the proceeding steps.

Figure 11:
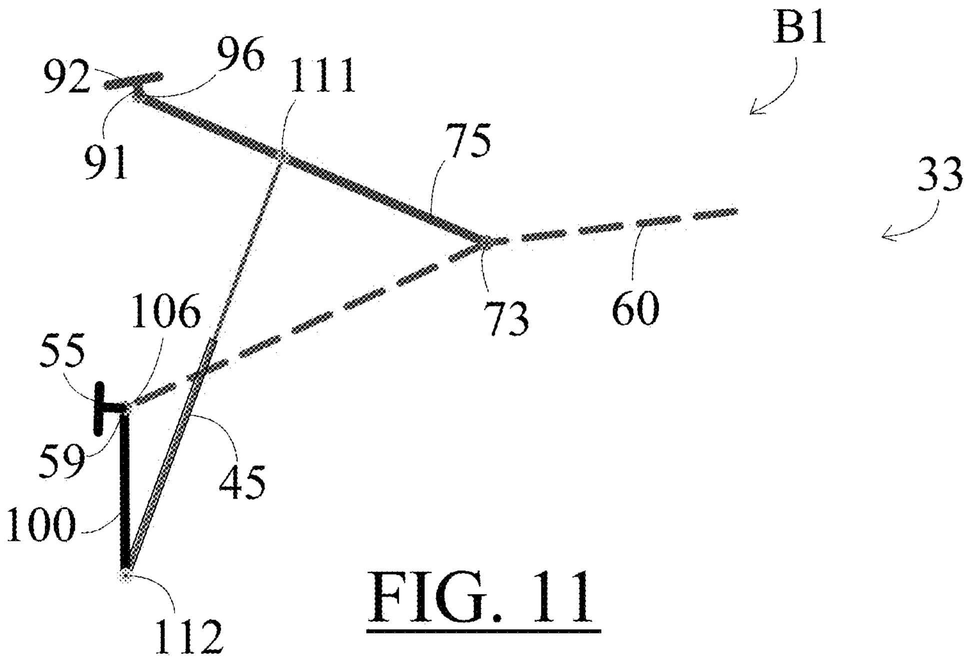
FIG. 11 is a schematic side view of a pop-up assembly, according to an embodiment of the invention.
Figure 10:
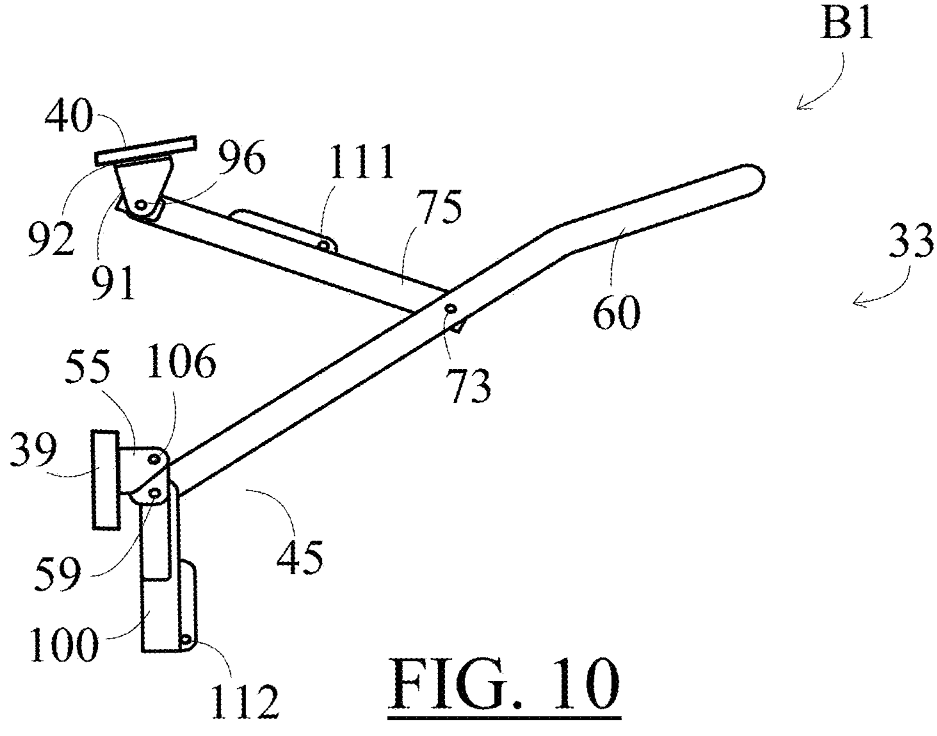
FIG. 10 is a side view of a pop-up assembly, according to an embodiment of the invention.
Figure 12:
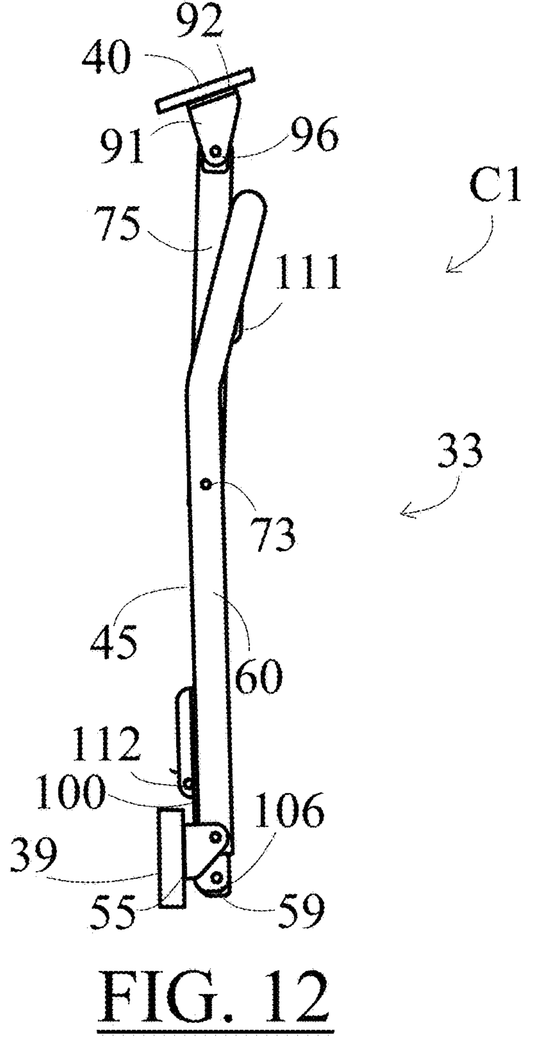
FIG. 12 is a side view of a pop-up assembly, according to an embodiment of the invention.
Figure 13:
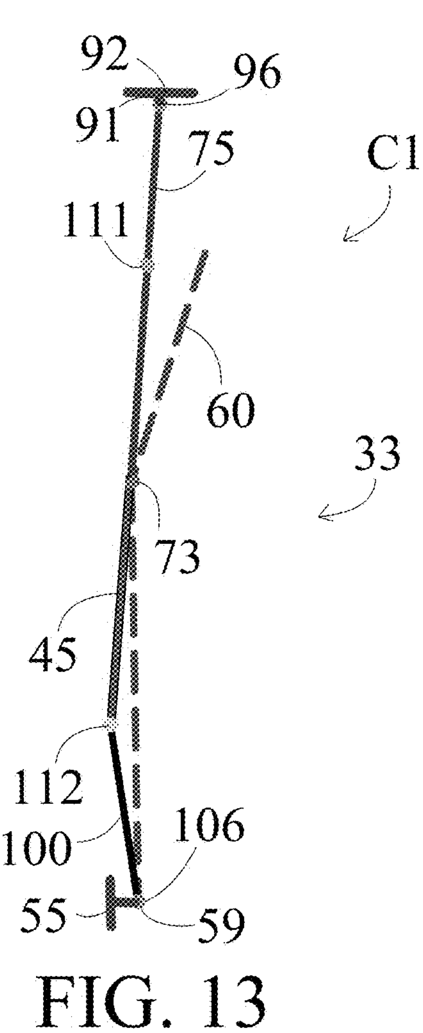
FIG. 13 is a schematic side view of a pop-up assembly, according to an embodiment of the invention.
Figure 15:
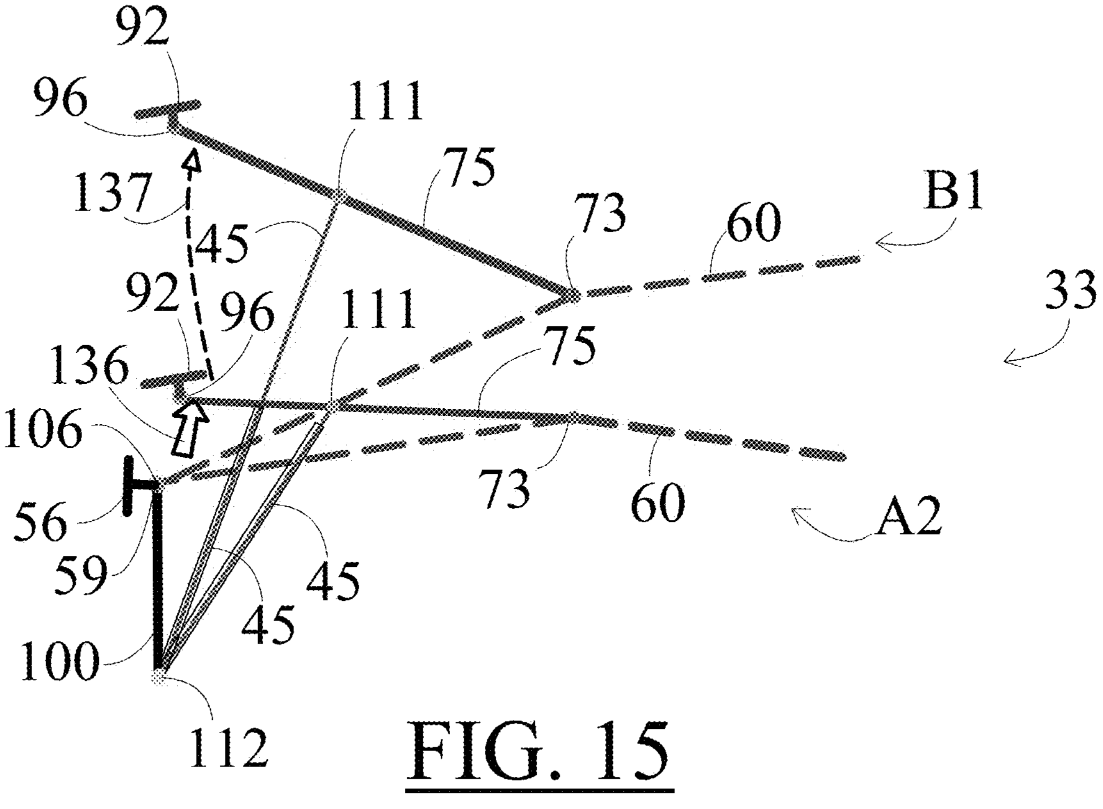
FIG. 15 is a schematic side view of an operational step of a pop-up roof system, according to an embodiment of the invention.

Position B1 of the pop-up assembly 33 is shown in FIGS. 10 and 11, with the canopy 40 raised to an "intermediate" position 133 by lifting of the roof-bar 75. The transition from Position A2 to Position B1 of the pop-up assembly in the operation of the pop-up roof system 15 is shown in FIG. 15. With the aid of the strut 45 extending from the retracted strut position 121 to the extended strut position 122 by an A2 applied force 136, on the roof-bar 75, with the bold arrow as also shown in FIG. 15. The roof-bar travels in an A2 to B1 movement 137 as shown with an arrow.

Figure 16:
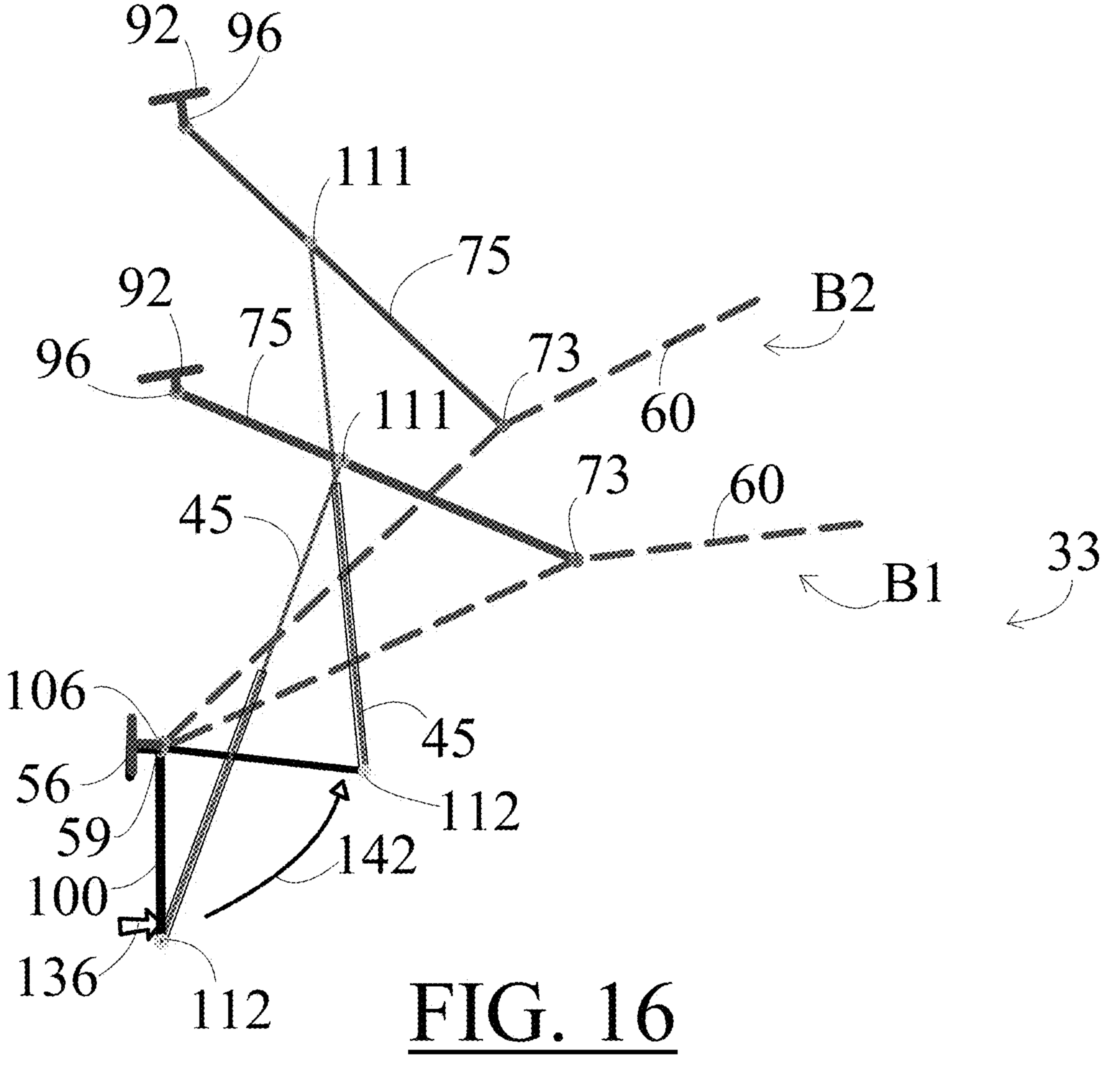
FIG. 16 is a schematic side view of an operational step of a pop-up roof system, according to an embodiment of the invention.

The actuated transition from Position B1 to Position B2 of the pop-up assembly 33 in the operation of the pop-up roof system 15 is shown in FIG. 16. With a B1 applied force 141 on the lock-bar 100, as shown in FIG. 16 with the bold arrow. The lock-bar travels in a B1 to B2 movement 142 as shown with an arrow. In Position B2 of the pop-up assembly, the roof-bar 75 and attached canopy 40 are further raised by continued lifting of the lock-bar to the next position.

Figure 17:
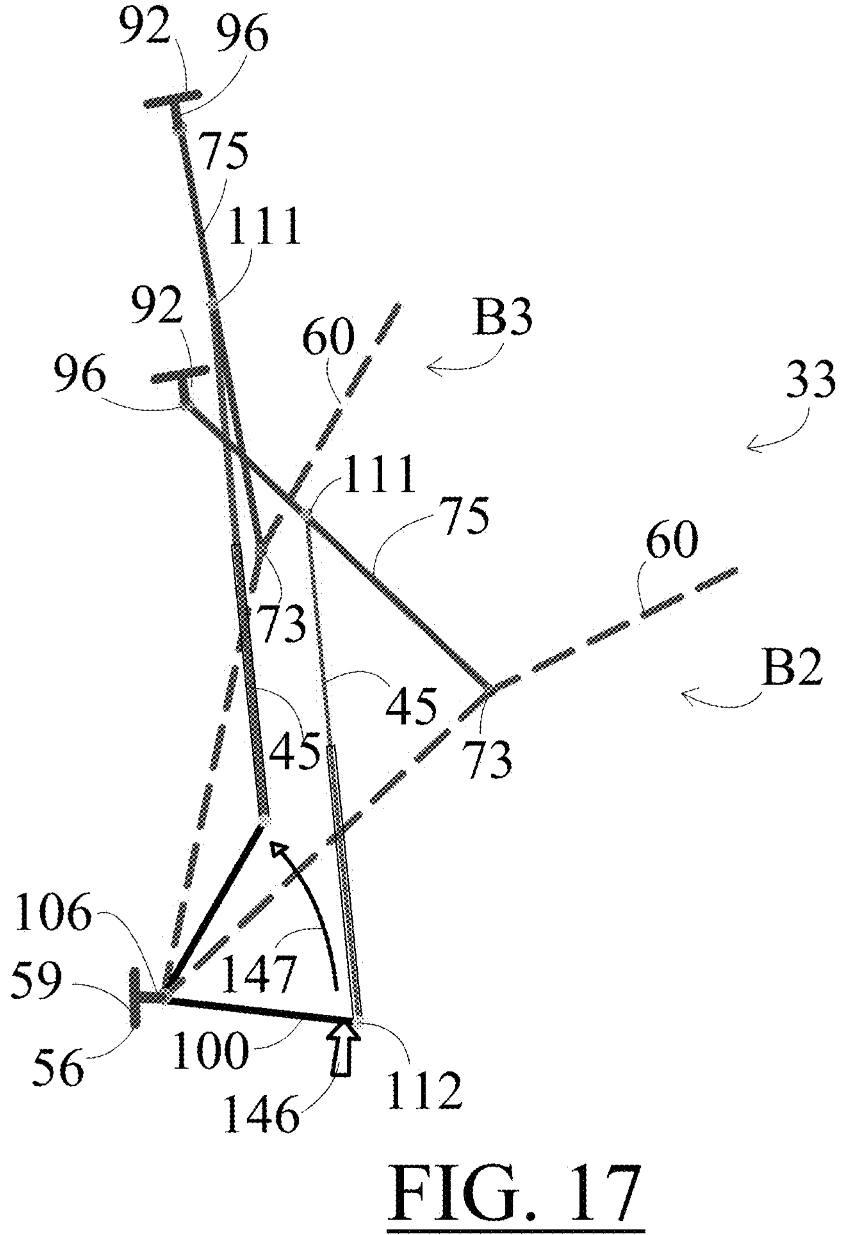
FIG. 17 is a schematic side view of an operational step of a pop-up roof system, according to an embodiment of the invention.

The actuated transition from Position B2 to Position B3 of the pop-up assembly 33 in the operation of the pop-up roof system 15 is shown in FIG. 17. Again, with a B2 applied force 146 on the lock-bar 100, as shown with the bold arrow. The lock-bar continues to travel, following a B2 to B3 movement 147 as shown with an arrow. In Position B3 of the pop-up assembly the roof-bar 75 and attached canopy 40 are further raised by continued lifting of the lock-bar.

Figure 18:
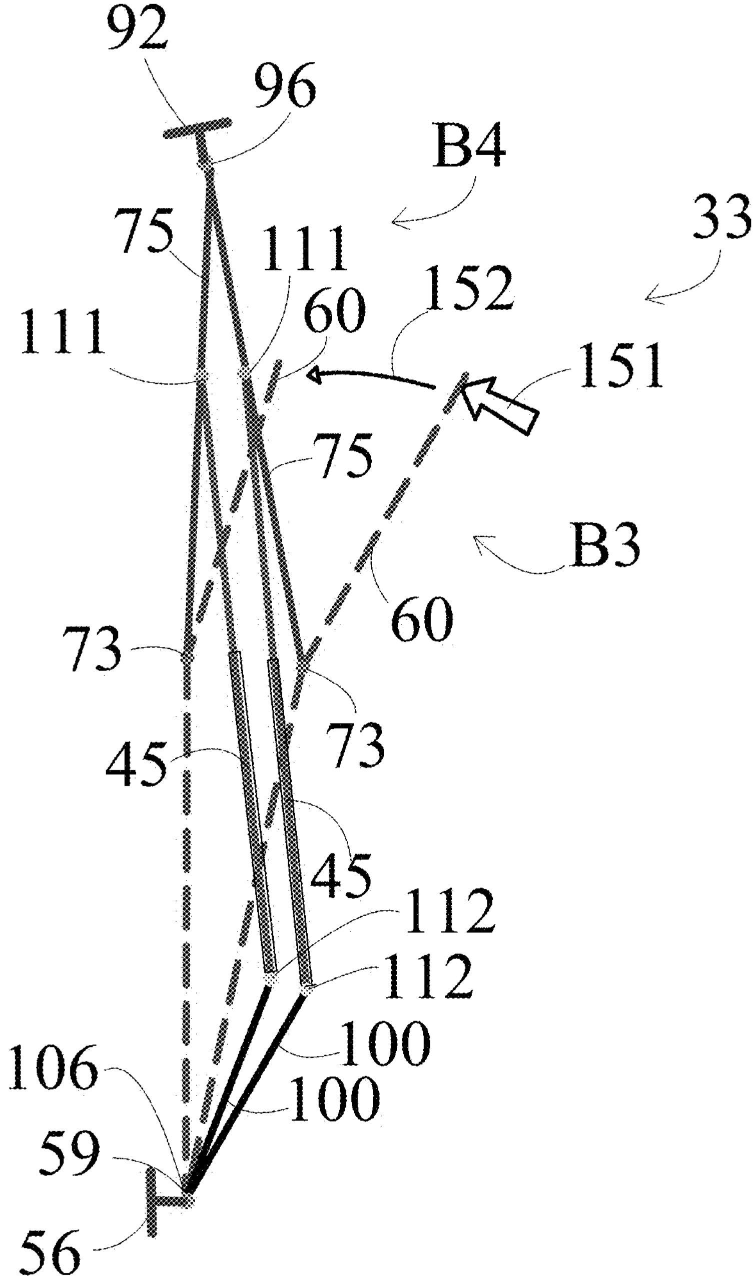
FIG. 18 is a schematic side view of an operational step of a pop-up roof system, according to an embodiment of the invention.

The actuated transition from Position B3 to Position B4 of the pop-up assembly 33 in the operation of the pop-up roof system 15 is shown in FIG. 18. This step requires a B3 applied force 151 on the lever-bar 60, as shown with the bold arrow. The lever-bar follows a B3 to B4 movement 152 as shown with an arrow.

Position C1 is a fully extended upward and locked position 154 of the pop-up assembly 33. Position C1 of the pop-up assembly 33 is shown in FIGS. 4A, 4B, 12, and 13, with the canopy 40 at the maximum height as shown in FIGS. 2, 4A and 4B, and with an extension screen 155 raised and the canopy locked in place with the strut 45 in the extended strut position 122, as shown in FIGS. 2. 4A, 4B and 12. Securely leveraging the roof-bar 75, in Position C1 the lock-bar 100 is rotated upward and tight against the interior sidewall 39 of the camper 19.

Figure 19:
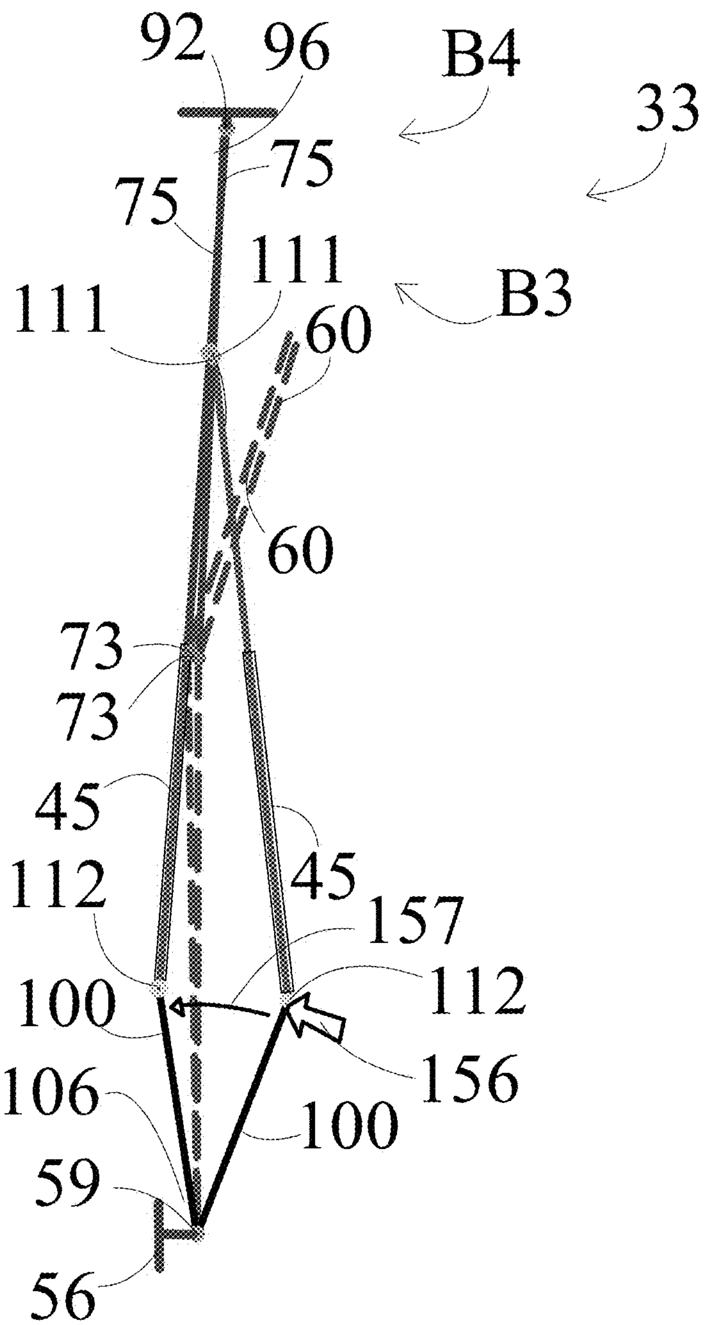
FIG. 19 is a schematic side view of an operational step of a pop-up roof system, according to an embodiment of the invention.

The actuated transition from Position B4 to Position C1 of the pop-up assembly 33 in the operation of the pop-up roof system 15 is shown in FIG. 19. This step requires a B4 applied force 156 on the lock-bar 100, as shown with the bold arrow. The lock-bar follows a B4 to C1 movement 157 as shown with an arrow.

The same series of operations in a reverse order, with the forces applied to the specific elements of the pop-up assembly 33 in the opposite directions to effect the opposite motions, will retract the canopy 40 from the fully extended upward and locked position 154, to the intermediate position 133 and then to the lowered or retracted canopy position 130.

Again, the applied forces on the pop-up assembly 33 may be a result of manual force or automated forces applied by actuators, springs, belts, tensioning straps or "bungee" types of elastic chords, or an equivalent. Linear actuators are also considered for use, as well as comb drive actuators, hydraulic actuators, pneumatic actuators, manual cranks, cables, or any other such mechanisms, as well known to those skilled in the associated actuator technologies.

The terms "approximately" and "proximate" are used herein to refer to a range of values or relative orientations, understood by a person skilled in the pertinent field or skill, as being substantially equivalent to the herein stated values in achieving the desired results, a range or a location typical to the accuracy and precision of conventional tooling, instrumentation or techniques, or a functionally equivalent range of features that produce equivalent results to those described herein.

The above detailed description of the innovations of the pop-up roof system 15 of the present invention are disclosed and described herein by way of example, however, it should be noted that other similar apparatus configurations of pop-up assembly 33 could be utilized in applying the herein disclosed embodiments, with the terms "connected", "attached", "coupled", and "mounted" refer to any form of interaction between two or more elements, including mechanical, electrical, magnetic, electromagnetic, fluid, and thermal interaction. Two components or elements may be functionally coupled with or to each other, even though they are not in direct contact with each other.

Also, the terms "substantially", and "approximately" or "approximate" are employed herein throughout, including this detailed description and the attached claims, with the understanding that is denotes a level of exactitude commensurate with the skill and precision typical for the particular field of endeavor, as applicable.

Additionally, the terminology used in this Detailed Description of Specific Embodiments is to be interpreted according to ordinary and customary usage in the field of the invention as exemplified in the pertinent U.S. and International Patent Classification Codes, and equivalent codes in other patent classification systems.

Also, the word "embodiment" is used herein to mean "serving as an example, instance, or illustration." Any embodiment described herein is not necessarily to be construed as preferred or advantageous over other embodiments. While the various aspects of the embodiments are presented in drawings, the drawings are not necessarily drawn to scale. Additionally, reference throughout this specification to "an embodiment" or "the embodiment" means that a particular feature, structure or characteristic described in connection with that embodiment is included in at least one embodiment. Thus, the quoted phrases, or variations thereof, as recited throughout this specification are not necessarily all referring to the same embodiment.

Similarly, it should be appreciated that the above Detailed Description of Specific Embodiments includes the referenced figures and following claims, and may be more simply referred to herein above as the "description" or the "disclosure." In this description, various features are sometimes grouped together in a single embodiment, figure, or written explanation thereof for the purpose of streamlining this disclosure. However, this method of disclosure is not to be interpreted as reflecting an intention that any claim require more features than those expressly recited in that claim. Rather, as the following claims reflect, inventive aspects lie in a combination of fewer than all features of any single foregoing disclosed embodiment. Thus, the claims following this description are hereby expressly incorporated into this description and disclosure, with each claim standing on its own as a separate embodiment. This description includes all permutations of the independent claims with their dependent claims. In compliance with the statutes, the invention has been described in language more or less specific as to structural features and process steps where applicable. While this invention is susceptible to embodiment in different forms, the specification illustrates preferred embodiments of the invention with the understanding that the present disclosure is to be considered an exemplification of the principles of the invention, and the disclosure is not intended to limit the invention to the particular embodiments described. Those with ordinary skill in the art will appreciate that other embodiments and variations of the invention are possible, which employ the same inventive concepts as described above. Therefore, the invention is not to be limited except by the following claims, as appropriately interpreted in accordance with the doctrine of equivalents.

What is claimed is:

1. A pop-up roof system for a vehicle, the pop-up roof system comprising:

a first pop-up assembly that includes a fore wall-mount and an aft wall-mount, the fore wall-mount securely attached to a fore sidewall placement on a first interior sidewall, and the aft wall-mount securely attached to an aft sidewall placement on the first interior sidewall;

a lever-bar that is substantially U-shaped, with a fore lever-bar distal end and an aft lever-bar distal end, the fore lever-bar distal end of the lever-bar hingeably attached to a fore lever-bar hinge of the fore wall-mount, and the aft lever-bar distal end of the lever-bar hingeably attached to an aft lever-bar hinge of the aft wall-mount;

the lever-bar includes a fore lever-bar arm that terminates with the fore lever-bar distal end, the lever-bar includes an aft lever-bar arm that terminates with the aft lever-bar distal end, a lever-bar grip-bar interconnects the fore lever-bar arm with the aft lever-bar arm, and the fore lever-bar arm includes a fore roof-bar pivot and the aft lever-bar arm includes an aft roof-bar pivot;

a roof-bar pivotably attached to the lever-bar at each roof-bar pivot, the roof-bar substantially U-shaped with a fore-roof distal end and an aft-roof distal end, the fore-roof distal end of the roof-bar hinge-ably attached to the fore roof-bar pivot on the lever-bar fore-arm and the aft-lever distal end of the lever bar hinge-ably attached to the aft roof-bar pivot on the lever-bar aft-arm, the roof-bar includes a fore roof-bar arm that terminates with the fore roof-bar distal end, the roof-bar includes an aft roof-bar arm that terminates with the aft roof-bar distal end, and a roof-bar lateral-bar interconnects the fore roof-bar arm with the aft roof-bar arm;

the roof-bar includes a fore roof-bar elbow located proximate to where the fore roof-bar arm meets the roof-bar lateral-bar, and the roof-bar includes an aft roof-bar elbow located proximate to where the aft roof-bar arm meets the roof-bar lateral-bar;

a fore canopy-link attaches to the canopy at a fore canopy-mount and an aft canopy-link attached to a canopy at an aft canopy-mount, the fore canopy-link includes a fore roof-bar pivot and the aft canopy-link includes an aft roof-bar pivot; and the fore roof-bar pivot attached to the roof-bar proximate to the fore roof-bar elbow, and the aft roof-bar pivot attaches to the roof-bar proximate to the aft roof-bar elbow;

a lock-bar hinge that receives a lock-bar, with a fore lock-bar arm that terminates at a fore lock-bar distal end, an aft lock-bar arm that terminates and an aft lock-bar distal end, the fore lock-bar distal end of the lock-bar hingeably attached to a fore lock-bar hinge of the fore wall-mount, and the aft lock-bar distal end of the lock-bar hingeably attached to an aft lock-bar hinge of the aft wall-mount;

the lock-bar substantially U-shaped and includes a lock-bar grip-bar that interconnects the lock-bar fore-arm with the lock-bar aft-arm;

a fore strut includes a fore strut lever-bar pivot and a fore strut lock-bar pivot at the opposite end of the fore-strut, and the aft strut including an aft strut lever-bar pivot and an aft strut lock-bar pivot at the opposite end of the aft-strut;

the fore-strut lock-bar pivot connects to a fore lock-bar strut bracket on the lock-bar, the fore-strut lever-bar pivot attached to a fore lever-bar strut bracket on the lever-bar, and the aft-strut lock-bar pivot connects to an aft lock-bar strut bracket on the lock-bar, the aft strut lever-bar pivot attached to an aft lever-bar strut bracket on the lever-bar; and the roof-bar supporting the canopy rises to an extended assembly position when the roof-bar is raised, and the roof-bar locks in the extended assembly position when the lever-bar is raised.

2. The pop-up roof system according to claim 1, additionally comprising:

a second pop-up assembly mounted on a second interior sidewall, for a parallel operation of the pop-up roof system with the first pop-up assembly.

3. The pop-up roof system according to claim 1, wherein the canopy is a roof structure on a camper unit.

4. The pop-up roof assembly according to claim 1, wherein the roof-bar supporting the canopy lowers to a retracted assembly position when the roof-bar is lowered, and the roof-bar locks in the retracted assembly position when the lever-bar is lowered.

5. The pop-up roof system according to claim 1, further comprising:

actuation of the pop-up roof assembly from a lowered canopy position, with the fore strut and the aft strut in a retracted strut position and the lock-bar rotated to press against an interior sidewall, and the lever-bar grip-bar rotated upward and tight against the canopy;

the lever-bar pulled downward with an first applied force and the lever-bar actuates in an first movement to raise the canopy from the lowered canopy position with the fore strut and the aft strut remaining in the retracted strut position;

the canopy raised to a primary intermediate position by lifting the roof-bar with the aid of the fore strut and extending from the retracted strut position to an extended strut position by a second applied force on the roof-bar to actuate the roof-bar in a second movement;

actuation of the lock-bar with a third applied force on the lock-bar to actuate the pop-up roof assembly in a third movement to a secondary intermediate position of the pop-up roof assembly;

the roof-bar and attached canopy further raised by a continued lift of the lock-bar for a further actuation of the lock-bar with a fourth applied force on the lock-bar, to further actuate the lock-bar, for a fourth movement to a tertiary intermediate position of the pop-up roof assembly to further raise the roof-bar and attached canopy by the continued lift of the lock-bar;

actuation of the lever-bar with a fifth applied force on the lever-bar to actuate the lever-bar in a fifth movement to a quaternary intermediate position of the pop-up roof assembly; and the lock-bar rotates upward and tight against the interior sidewall to leverage the roof-bar into the extended assembly position of the pop-up assembly, with a sixth applied force on the lock-bar to actuate the lock-bar in a sixth movement.

6. The pop-up roof system according to claim 1, additionally wherein:

the fore wall-mount is attached to an interior sidewall of a camper unit proximate to a forward end of a camper, and the aft wall-mount is attached to the interior sidewall of the camper proximate to the rearward end of the camper.

7. The pop-up roof system according to claim 2, further comprising:

a multiple of auxiliary struts attached to the canopy to aid an actuation of the first pop-up assembly, the multiple of auxiliary struts including a front pair of aux struts mounted at the foreword end of a camper and a second pair of aux struts mounted at the rearward end of the camper, the canopy is a roof structure on a camper unit, and the front pair and the rear pair of the auxiliary struts operate together aid operation of the first pop-up assembly and the pop-up assembly;

each of the multiple of auxiliary struts has a canopy auxiliary strut connection and a sidewall cap auxiliary strut connection, and the canopy aux strut connection of each of the four auxiliary struts mounts to the canopy above the sidewall aux strut connection, and the sidewall auxiliary strut connection mounts to the camper proximate to the upper portion of the camper near a sidewall cap; and the set of four auxiliary struts substantially counter the weight of the canopy to augment a lifting action of the fore strut and the aft strut components of the pop-up assemblies.

8. A method of a pop-up roof system for a vehicle, the method of the pop-up roof system comprising the steps of:

a) providing a first pop-up assembly including a fore wall-mount and an aft wall-mount, the fore wall-mount securely attached to a fore sidewall placement on a first interior sidewall, and the aft wall-mount securely attached to an aft sidewall placement on the first interior sidewall;

b) providing a lever-bar that is substantially U-shaped, with a fore lever-bar distal end and an aft lever-bar distal end, the fore lever-bar distal end of the lever-bar hingeably attached to a fore lever-bar hinge of the fore wall-mount, and the aft lever-bar distal end of the lever-bar hingeably attached to an aft lever-bar hinge of the aft wall-mount, the lever-bar including a fore lever-bar arm that terminates with the fore lever-bar distal end, the lever-bar includes an aft lever-bar arm that terminates with the aft lever-bar distal end, a lever-bar grip-bar inter connects the fore lever-bar arm with the aft lever-bar arm, and the fore lever-bar arm including a fore roof-bar pivot and the aft lever-bar arm includes an aft roof-bar pivot;

c) providing a roof-bar pivotably attached to the lever-bar at each roof-bar pivot, the roof-bar substantially U-shaped with a fore-roof distal end and an aft-roof distal end, the fore-roof distal end of the roof-bar hinge-ably attached to the fore roof-bar pivot on the lever-bar fore-arm and the aft-lever distal end of the lever bar hinge-ably attached to the aft roof-bar pivot on the lever-bar aft-arm, the roof-bar including a fore roof-bar arm that terminates with the fore roof-bar distal end, the roof-bar includes an aft roof-bar arm that terminates with the aft roof-bar distal end, a roof-bar lateral-bar interconnects the fore roof-bar arm with the aft roof-bar arm, the roof-bar including a fore roof-bar elbow located proximate to where the fore roof-bar arm meets the roof-bar lateral-bar, and the roof-bar includes an aft roof-bar elbow located proximate to where the aft roof-bar arm meets the roof-bar lateral-bar;

d) providing a fore canopy-link attaches to a canopy at a fore canopy-mount and an aft canopy-link attached to the canopy at an aft canopy-mount, the fore canopy-link includes a fore roof-bar pivot and the aft canopy-link includes an aft roof-bar pivot; and the fore roof-bar pivot attached to the roof-bar proximate to the fore roof-bar elbow, and the aft roof-bar pivot attaches to the roof-bar proximate to the aft roof-bar elbow;

e) providing a lock-bar hinge that receives a lock-bar, with a fore lock-bar arm that terminates at a fore lock-bar distal end, an aft lock-bar arm that terminates and an aft lock-bar distal end, the fore lock-bar distal end of the lock-bar hingeably attached to a fore lock-bar hinge of the fore wall-mount, the aft lock-bar distal end of the lock-bar hingeably attached to an aft lock-bar hinge of the aft wall-mount, and the lock-bar substantially U-shaped and includes a lock-bar grip-bar that interconnects the lock-bar fore-arm with the lock-bar aft-arm;

f) providing a fore strut lever-bar pivot and a fore strut lock-bar pivot at the opposite end of the fore-strut, and the aft strut including an aft strut lever-bar pivot and an aft strut lock-bar pivot at the opposite end of the aft-strut, the fore-strut lock-bar pivot connecting to a fore lock-bar strut bracket on the lock-bar, the fore-strut lever-bar pivot attached to a fore lever-bar strut bracket on the lever-bar, and the aft-strut lock-bar pivot connecting to an aft lock-bar strut bracket on the lock-bar, the aft strut lever-bar pivot attached to an aft lever-bar strut bracket on the lever-bar;

g) providing the roof-bar supporting the canopy is raised to an extended assembly position when the roof-bar is raised, and the roof-bar is locked in the extended assembly position when the lever-bar is raised;

h) actuating the pop-up roof assembly from a lowered canopy position, with the fore strut and the aft strut in a retracted strut position and the lock-bar rotated to press against an interior sidewall, and the lever-bar grip-bar rotated upward and tight against the canopy;

i) pulling the lever-bar downward with an first applied force actuating the lever-bar in an first movement to raise the canopy from the lowered canopy position with the fore strut and the aft strut remaining in the retracted strut position;

j) raising the canopy to a primary intermediate position by lifting the roof-bar with the aid of the fore strut and extending from the retracted strut position to an extended strut position by a second applied force on the roof-bar actuating the roof-bar in a second movement;

k) rotating the lock-bar with a third applied force on the lock-bar and actuating the pop-up roof assembly in a third movement to a secondary intermediate position of the pop-up roof assembly;

l) further raising the roof-bar and attached canopy by a continued lifting of the lock-bar for further actuating the lock-bar with a fourth applied force on the lock-bar, and further actuating the lock-bar for a fourth movement to a tertiary intermediate position of the pop-up roof assembly, further raising the roof-bar and attached canopy by the continued lift of the lock-bar;

m) pushing of the lever-bar with a fifth applied force on the lever-bar to actuate the lever-bar in a fifth movement to a quaternary intermediate position of the pop-up roof assembly; and n) rotating the lock-bar upward and tight against the interior sidewall to leverage the roof-bar into the extended assembly position of the pop-up assembly, with a sixth applied force on the lock-bar actuating the lock-bar in a sixth movement.

9. A method of a pop-up roof system for a vehicle of claim 8 additionally including the steps of:

o) lowering the roof-bar supporting the canopy to a retracted assembly position; and p) lowering the lever-bar to lock the roof-bar in the retracted assembly position.

* * * * *